(12) United States Patent
Umezawa (10) Patent No.: US 9,712,706 B2
(45) Date of Patent: Jul. 18, 2017

(54) IMAGE FORMING APPARATUS AND BLANK SHEET OUTPUT CONFIRMATION METHOD THAT FACILITATE REMOVAL OF BLANK SHEET FROM PRINTED MATTER

(71) Applicant: Kyocera Document Solutions Inc., Osaka (JP)

(72) Inventor: Hideo Umezawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/872,021

(22) Filed: Sep. 30, 2015

(65) Prior Publication Data

US 2016/0094746 A1    Mar. 31, 2016

(30) Foreign Application Priority Data

Sep. 30, 2014 (JP) .................. 2014-200429

(51) Int. Cl.
*H04N 1/00* (2006.01)

(52) U.S. Cl.
CPC ..... *H04N 1/00803* (2013.01); *H04N 1/00411* (2013.01); *H04N 1/00442* (2013.01); *H04N 1/00458* (2013.01); *H04N 2201/0094* (2013.01)

(58) Field of Classification Search
None
See application file for complete search history.

(56) References Cited

FOREIGN PATENT DOCUMENTS

| JP | 2002-116665 A |   | 4/2002 |
|----|---------------|---|--------|
| JP | 2004-147193 A |   | 5/2004 |
| JP | 2005269178 A  | * | 9/2005 |
| JP | 2006-130784 A |   | 5/2006 |
| JP | 2009-177623 A |   | 8/2009 |
| JP | 2011053766 A  | * | 3/2011 |

* cited by examiner

*Primary Examiner* — Joshua D Zimmerman
(74) *Attorney, Agent, or Firm* — James Judge (57) ABSTRACT

An image forming apparatus for performing image formation based on image data on a print job to output a printed matter includes a blank sheet detecting unit, a blank sheet processing unit and a blank sheet display unit. The blank sheet detecting unit determines whether the image data in the print job is blank sheet image data or non-blank sheet image data by each piece of image data. The blank sheet processing unit detects an order of the determined blank sheet image data and outputs a blank sheet corresponding to the blank sheet image data such that the blank sheet is displaced with respect to a printed matter corresponding to the non-blank sheet image data by a predetermined amount. The blank sheet display unit displays an order of blank sheet among the orders of the printed matters.

1 Claim, 8 Drawing Sheets

IMAGE FORMING APPARATUS AND BLANK SHEET OUTPUT CONFIRMATION METHOD THAT FACILITATE REMOVAL OF BLANK SHEET FROM PRINTED MATTER

INCORPORATION BY REFERENCE

This application is based upon, and claims the benefit of priority from, corresponding Japanese Patent Application No. 2014-200429 filed in the Japan Patent Office on Sep. 30, 2014, the entire contents of which are incorporated herein by reference.

BACKGROUND

Unless otherwise indicated herein, the description in this section is not prior art to the claims in this application and is not admitted to be prior art by inclusion in this section.

An image forming apparatus such as a copier, a facsimile, and a multi-functional peripheral has had a following problem. That is, when an original document to be read includes a sheet of unnecessary blank sheet page on which no object such as a character and a figure is recorded, the image data of the sheet of the blank sheet page is read without change and image formation is performed on a recording sheet, then the unnecessary blank sheet page is included after copying process. This leads to deterioration of output efficiency.

To solve the problem, for example, there has been a proposed image forming apparatus that performs image formation on one side or both sides of a record sheet, based on image data of an one-sided document constituted of a sheet having an object such as a character and a figure recorded on an one side thereof, or image data of a double-sided document constituted of a sheet having objects recorded on both sides thereof. The image forming apparatus includes a blank page judging unit, which determines whether a blank page in which no object is recorded is included based on the image data. When the image forming apparatus performs the image formation on one side of a record sheet, the blank page judging unit determines whether a blank page is included, and when the blank page judging unit determines that a blank page is included, the image formation is performed excluding this blank page. This ensures to remove only an unnecessary blank page and effectively prevent lowering of efficiency due to image formation of an unnecessary blank page.

There has been a proposed image forming apparatus that scans an original document at a scanner unit to obtain digital image data for outputting to such as a facsimile and a copier. The image forming apparatus includes a blank sheet detecting unit that detects a blank sheet page among image data output from the scanner unit, a warning unit that transmits an alert when a blank sheet is detected at the blank sheet detecting unit, and a recording unit that records image data output from the scanner unit. This ensures to detect a scanned blank sheet easily even when an original document is scanned with being set in mistaking its front and back.

There has been a proposed image processing apparatus including an image input unit to scan an original document to input image data, a compression unit to compress this image data, and a storage unit to store the data compressed by this compression unit. The image processing apparatus includes a blank sheet determining unit that determines whether or not the image data is a blank sheet document based on the amount of the compressed data and an image processing unit that performs a predetermined image processing based on the result of the determination by the blank sheet determining unit. This ensures to determine an original document to be a blank sheet without locating a new function circuit.

SUMMARY

An image forming apparatus according to one aspect of the disclosure performs image formation based on image data on a print job to output a printed matter. The image forming apparatus includes a blank sheet detecting unit, a blank sheet processing unit and a blank sheet display unit. The blank sheet detecting unit determines whether the image data in the print job is blank sheet image data or non-blank sheet image data by each piece of image data. The blank sheet processing unit detects an order of the determined blank sheet image data and outputs a blank sheet corresponding to the blank sheet image data such that the blank sheet is displaced with respect to a printed matter corresponding to the non-blank sheet image data by a predetermined amount. The blank sheet display unit displays an order of blank sheet among the orders of the printed matters.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

One embodiment of an image forming apparatus according to the disclosure will be described below with reference to the attached drawings, for ease of understanding the disclosure. Please note that the following embodiments are merely exemplary embodiments according to the disclosure and not intended to limit the technical scope of the disclosure. The alphabets S attached before numerals in the flowchart mean steps.

Image Forming Apparatus

Figure 1:
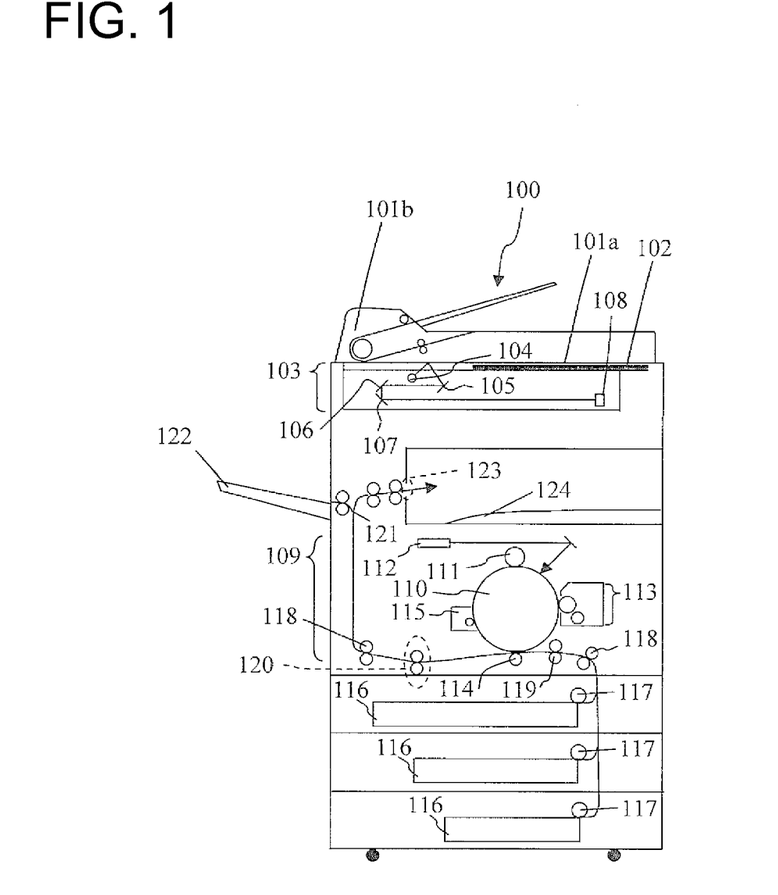
FIG. 1 illustrates the overall configuration of an inside a multi-functional peripheral according to one embodiment of the disclosure.

The image forming apparatus according to the embodiment of the disclosure is, for example, an image forming apparatus, and a description will be given of the image forming apparatus below. FIG. 1 is a schematic diagram of the image forming apparatus according to one embodiment of the disclosure. However, the details of respective units that do not relate to the disclosure directly are omitted.

The image forming apparatus of the disclosure corresponds to, for example, a stand-alone printer and scanner, or such as a multi-functional peripheral including a printer, a copying machine, a scanner, a facsimile, and a similar function. The image forming apparatus functions as an image forming apparatus including a copy function, a scanner function, a facsimile function, a printer function, and a similar function.

The following briefly describes the performance of a multi-functional peripheral 100 (multifunction peripheral: MFP), when, for example, the copy function is used.

First, when a user uses the multi-functional peripheral 100, the user places an original document on a platen 101a, which is located in the top surface of a housing portion, or a placement table 101b, which is located in an automatic document feeding unit. Subsequently, the user uses an operation unit 102 (operation panel), which is located near the platen 101a, to input the setting condition relating to image formation from the operation screen of this operation unit 102. Then, pressing down a start key, which is located in the operation unit 102, by the user causes the multi-functional peripheral 100 to start image formation (printing process).

Next, in an image reading unit 103, the light irradiated from a light source 104 is reflected to the original document placed on the platen 101a. The reflected light is guided to an imaging device 108 by mirrors 105, 106, and 107. The guided light is photoelectrically converted by the imaging device 108, and then, the image data corresponding to the original document is created.

A part that forms a toner image based on the image data is an image forming unit 109. The image forming unit 109 includes a photoreceptor drum 110. The photoreceptor drum 110 rotates at a constant speed in a predetermined direction. In the peripheral area of the photoreceptor drum 110, a charger 111, an exposure unit 112, a developing unit 113, a transfer unit 114, a cleaning unit 115, and a similar unit are located in this order from upstream of the rotation direction.

The charger 111 uniformly charges the surface of the photoreceptor drum 110. The exposure unit 112 irradiates a laser beam to the surface of the charged photoreceptor drum 110 based on the image data to form an electrostatic latent image. The developing unit 113 attaches toner to the formed electrostatic latent image to form a toner image. The formed toner image is transferred to a recording medium (such as a paper sheet and a sheet) by the transfer unit 114. The cleaning unit 115 removes extra toner remaining on the surface of the photoreceptor drum 110. The rotation of the photoreceptor drum 110 executes the set of processes.

The paper is fed from a plurality of paper feed cassettes 116 included in the multi-functional peripheral 100. The paper is sent and conveyed from any one of the paper feed cassettes 116 to a conveyance path by a pickup roller 117. Each of the paper feed cassettes 116 houses respectively different kind of papers. Each of the paper feed cassettes 116 feeds papers based on the setting condition for image formation.

The paper sent to the conveyance path is conveyed to between the photoreceptor drum 110 and the transfer unit 114 by a conveyance roller 118 and a registration roller 119. The paper sent to between the photoreceptor drum 110 and the transfer unit 114, on which the toner image is transferred by the transfer unit 114, is conveyed to a fixing unit 120.

The paper on which the toner image is transferred passes through between a heating roller and a pressure roller, which are included in the fixing unit 120. Then, heat and pressure is applied to the toner image, and a visible image is fixed on the paper. The heat amount of the heating roller is set appropriately corresponding to the kind of the paper to perform the fixing appropriately. Thus, the visible image is fixed on the paper, terminating the image formation. This paper is guided to a path switching unit 121 by the conveyance roller 118.

The path switching unit 121, corresponding to an instruction to switch by the multi-functional peripheral 100, guides the paper to a sheet discharge tray 122, which is located on the side face of the housing portion. Alternatively, the path switching unit 121 guides the sheet to an in-barrel tray 124, which is located in the barrel of the housing portion, via a sheet discharge exit 123. The paper is loaded and housed in the sheet discharge tray 122 or the in-barrel tray 124. The procedure causes the housing portion of the multi-functional peripheral 100 to provide the copying function to the user.

Figure 2:
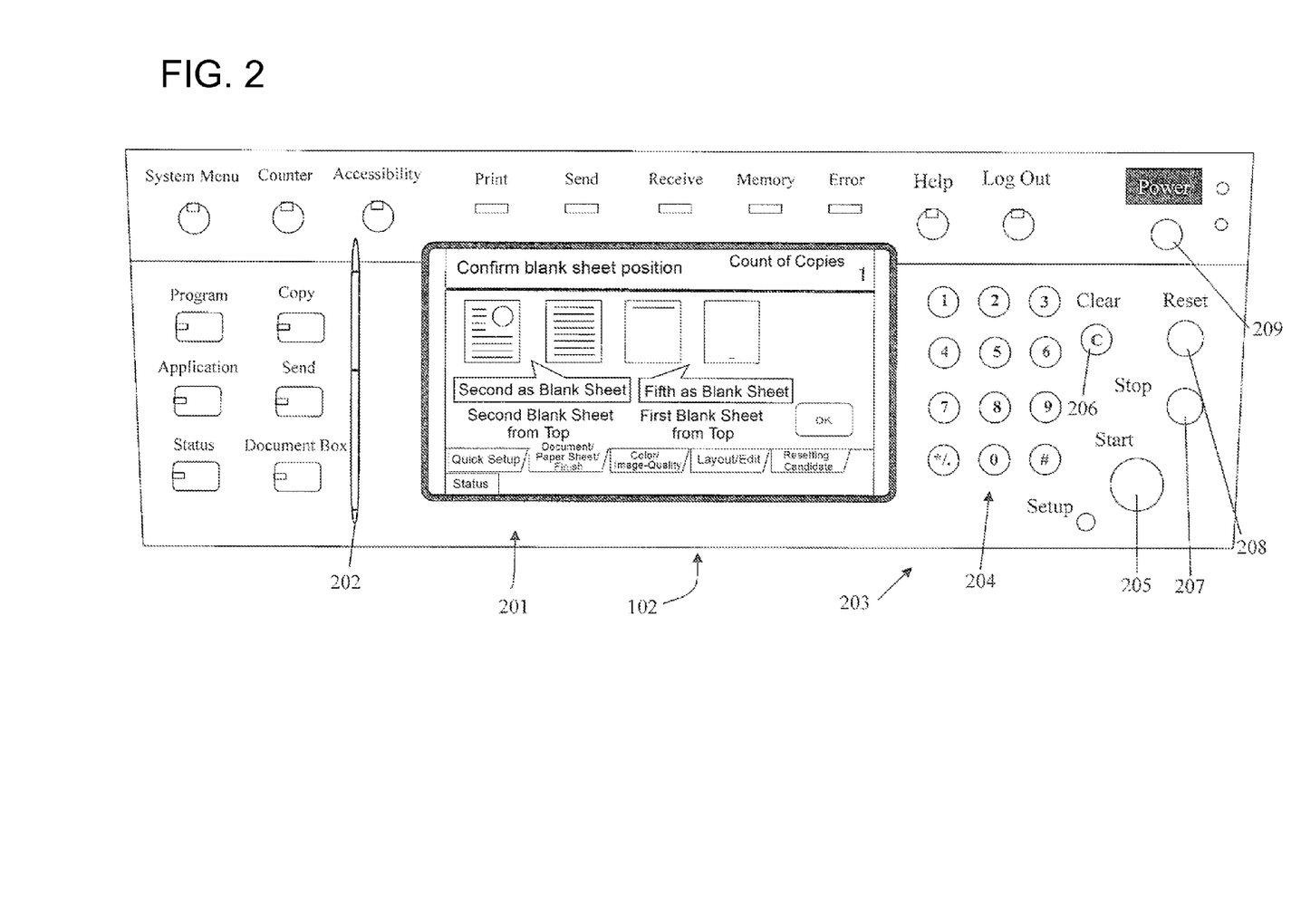
FIG. 2 illustrates the overall configuration of an operation unit according to the one embodiment.

Next, FIG. 2 is a conceptual diagram of the overall configuration of the operation unit according to the embodiment of the disclosure. The user uses the operation unit 102 to input the setting condition for the above-described image formation, or to confirm the setting condition that is input. To input the setting condition, a touch panel 201 (operation panel), a stylus pen 202, and an operation key 203, which are included in the operation unit 102, are used.

The touch panel 201 has both a function to input a setting condition and a function to display this setting condition. That is, touching a key within the screen displayed on the touch panel 201 causes the setting condition corresponding to this touching key to be input.

On the back-side of the touch panel 201, a display unit (not illustrated) such as a liquid crystal display (LCD) is located. This display unit displays an operation screen such as the initial screen. Near the touch panel 201, the stylus pen 202 is located. Touching the tip of the stylus pen 202 to the touch panel 201 by the user causes the touch panel 201 to detect where is touched.

Further, near the touch panel 201, the predetermined count of operation key 203 are located. The predetermined count of operation key 203 include, for example, a numeric keypad 204, a start key 205, a clear key 206, a stop key 207, a reset key 208, and a power key 209.

Figure 3:
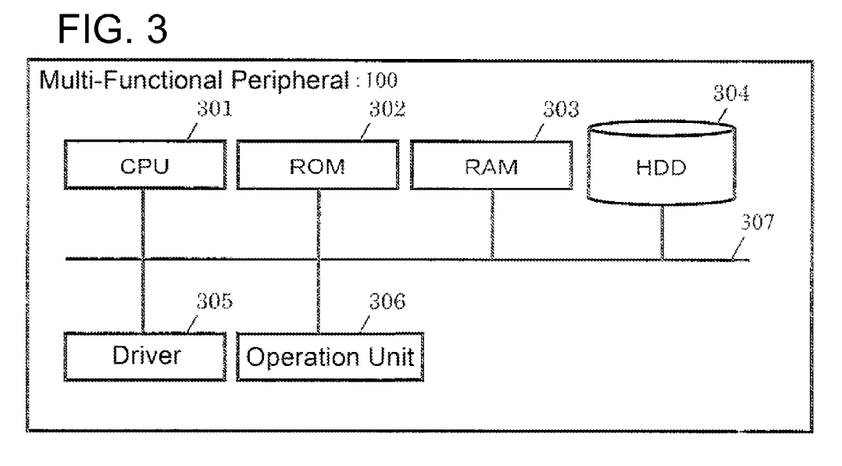
FIG. 3 illustrates the configuration of control system hardware of the multi-functional peripheral according to the one embodiment.

Next, with reference to FIG. 3, the configuration of the control system hardware of the multi-functional peripheral 100 will be described. FIG. 3 illustrates the configuration of the control system hardware of the multi-functional peripheral 100 according to the disclosure. However, the details of respective units that do not relate to the disclosure directly are omitted.

A control circuit of the multi-functional peripheral 100 connects a central processing unit (CPU) 301, a read only memory (ROM) 302, a random access memory (RAM) 303, a hard disk drive (HDD) 304, a driver 305 corresponding to each driving unit, and an operation unit 306 (102) via an internal bus 307.

The CPU 301 uses, for example, the RAM 303 as work area. The CPU 301 executes the program stored in such as the ROM 302 and the HDD 304. Based on this execution result, the CPU 301 transmits and receives data and a command from the driver 305 and the operation unit 306, a signal and an instruction corresponding to a key and similar data, so as to control performances of each driving unit indicated in FIG. 1.

The execution of the program by the CPU 301 ensures the execution of these respective units, which are described below (see FIG. 4) other than the driving unit. The ROM 302, the HDD 304, or a similar medium, which are non-transitory computer-readable recording mediums, stores the program and data to ensure the respective units, which are described below.

Embodiments of Disclosure

Figure 4:
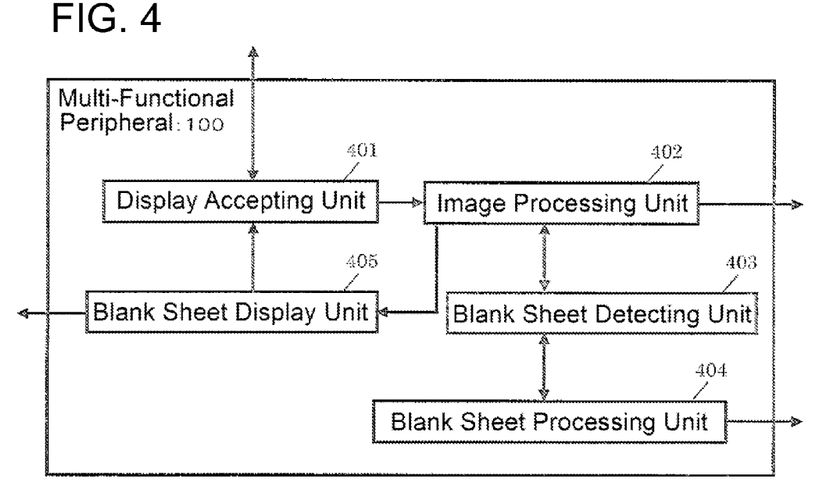
FIG. 4 illustrates a function block of the multi-functional peripheral according to one embodiment of the one embodiment.
Figure 5:
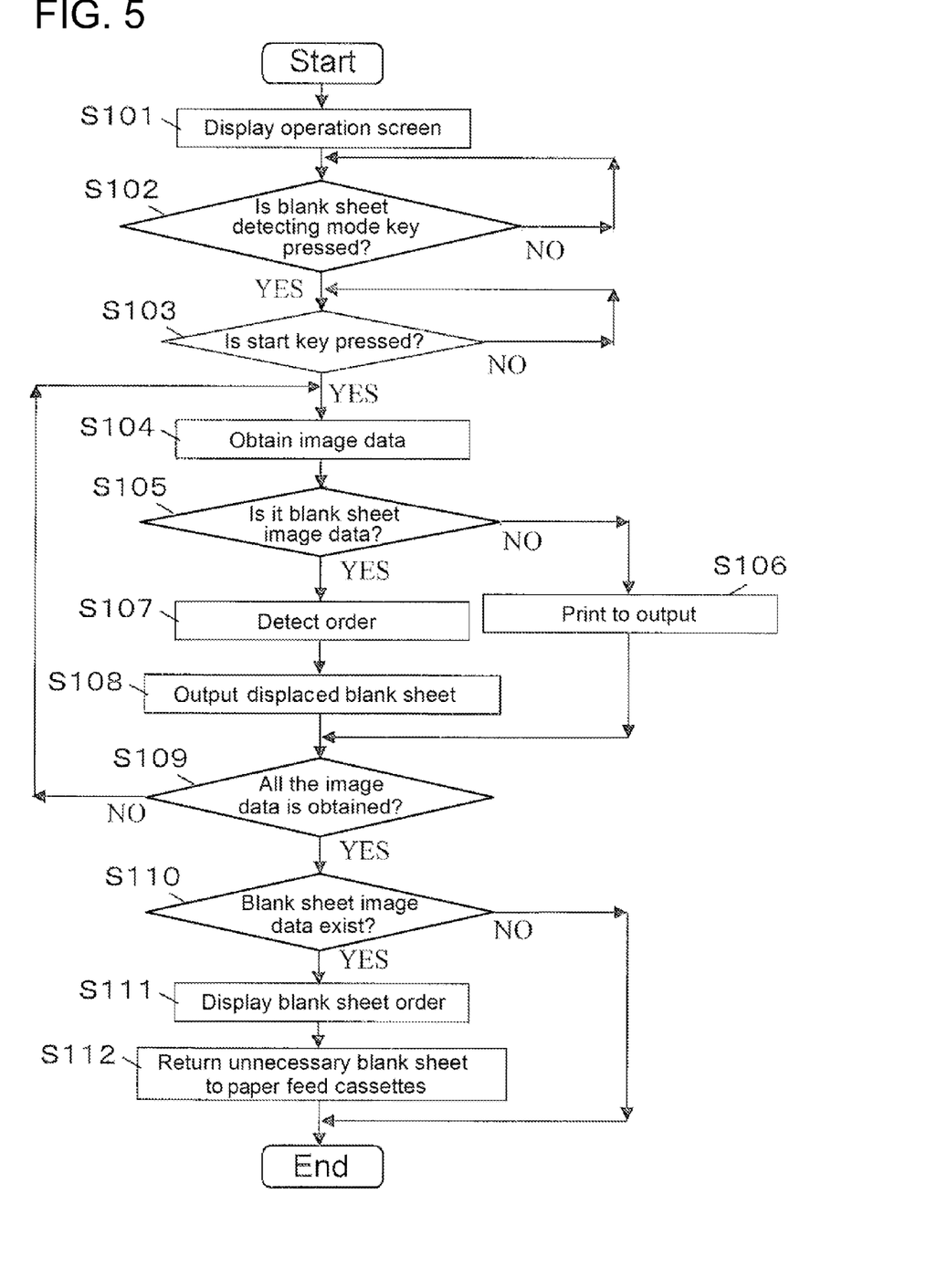
FIG. 5 illustrates an execution procedure according to the one embodiment of the one embodiment.

Next, a description will be given of the configuration and the execution procedure according to the embodiment of the disclosure with reference to FIGS. 4 and 5. FIG. 4 is a function block diagram of the multi-functional peripheral according to the disclosure. FIG. 5 is a flowchart indicating the execution procedure according to the disclosure.

First, a user turns on the power supply of the multi-functional peripheral 100 to initiate this multi-functional peripheral 100, and a display accepting unit 401 displays an initial screen 600 (operation screen) on the touch panel 201 (FIG. 5: Step S101).

Figure 6A:
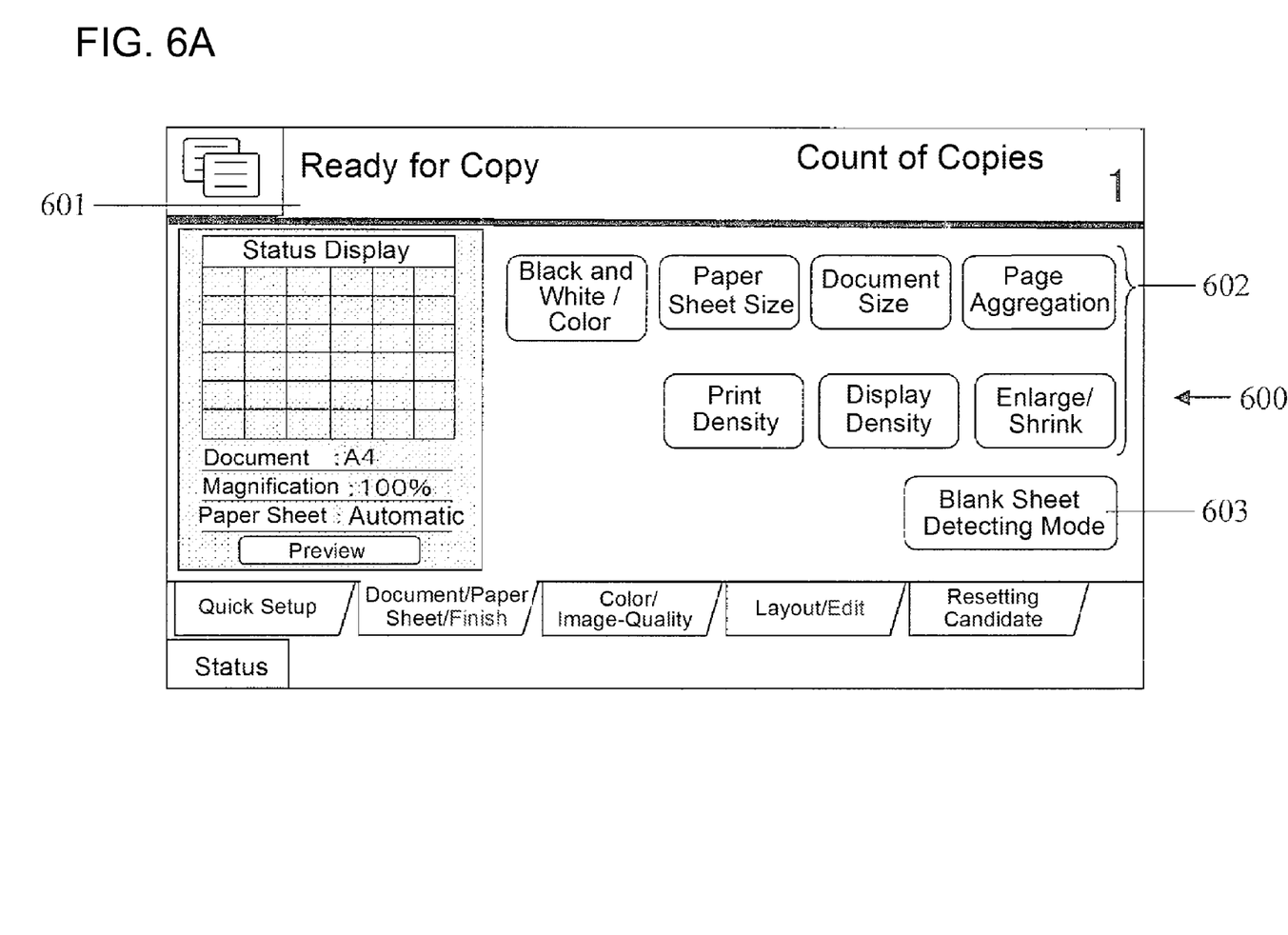
FIG. 6A illustrates an exemplary operation screen displayed on a touch panel according to the one embodiment of the one embodiment.

As illustrated in FIG. 6A, a predetermined message 601 "Ready for Copy" is displayed on the initial screen 600. At the same time, a functional item key 602, which is for inputting the setting condition such as the copy function, and a blank sheet detecting mode key 603, which is for detecting whether or not predetermined image data in the print job is blank sheet image data, are displayed as touchable. The blank sheet image data includes image data without any characters such as a letter, image data accidentally without any letters or similar character at a line break position, image data when a blank sheet is as it is read as image data, and similar image data among document files as print targets.

Here, for example, when the user touches the blank sheet detecting mode key 603 (FIG. 5: YES at Step S102), the display accepting unit 401 accepts the touching of this blank sheet detecting mode key 603 to change the background color of this blank sheet detecting mode key 603 to a color that is different from the background color of other keys. Then, the display accepting unit 401 makes the multi-functional peripheral 100 in a state (setting) where the blank sheet detecting mode is accepted.

Next, the user, for example, places original documents (bundle) as the print target on the placement table 101b of the automatic document feeding unit, and touches the predetermined functional item key 602 to input the predetermined setting condition. Then, when the user presses down the start key 205 of the operation unit 102 (FIG. 5: YES at Step S103), the display accepting unit 401 accepts the setting of the blank sheet detecting mode, the setting condition, and the pressing down input of this start key 205 to notify an image processing unit 402 of the acceptance. When the image processing unit 402 receives this notification, the image processing unit 402 accepts the setting of the blank sheet detecting mode and a print job to perform image formation based on the predetermined image data.

Here, when the bundle of documents is placed on the placement table 101b, the image processing unit 402 feeds the original document placed on the placement table 101b of this automatic document feeding unit one by one to read the image data in this original document. Then, the image processing unit 402 obtains (accept) this read image data as the image data for the print job (FIG. 5: Step S104).

Any method other than the above-described method may be employed for the image processing unit 402 to obtain the image data for the print job. For example, the image processing unit 402 may cause the user to place the original document on the platen 101a one by one to read the image data in the original document. This ensures the image processing unit 402 to obtain the image data for the print job.

When the image processing unit 402 completes obtaining (accepting) of one of the image data for the print job, the image processing unit 402 notifies a blank sheet detecting unit 403 of the obtaining (accepting) because the setting of the blank sheet detecting mode has been accepted. With receiving this notification, the blank sheet detecting unit 403 determines whether or not the image data in the print job is blank sheet image data by each image data (FIG. 5: Step S105).

Any method may be employed for the blank sheet detecting unit 403 to determine whether or not the image data in the print job is blank sheet image data. For example, the processes can be performed as follows.

Figure 6B:
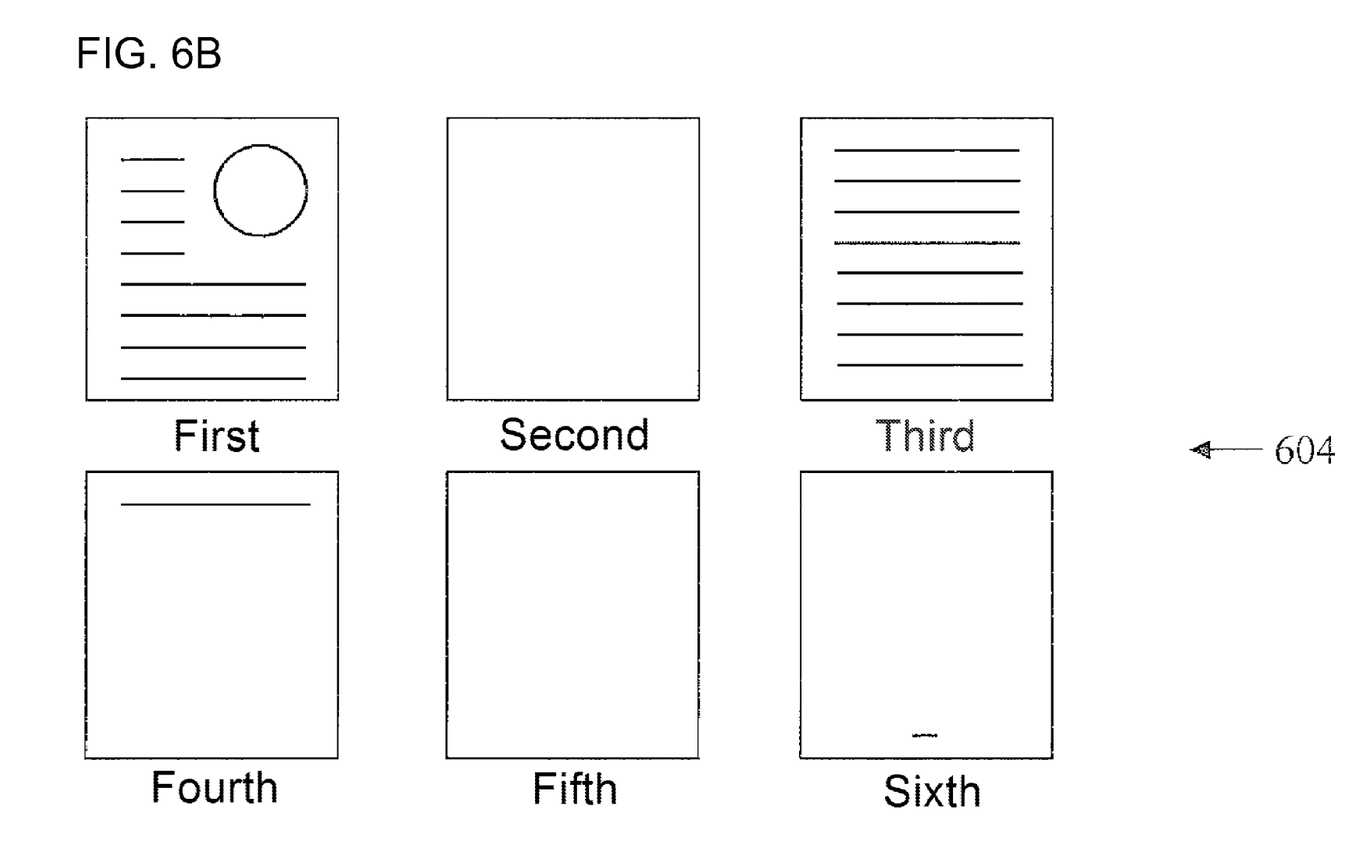
FIG. 6B illustrates an exemplary type of image data according to the one embodiment.

For example, as illustrated in FIG. 6B, assume that a counts of image data 604 on the print job is six pieces (sheets), and the first image data is image data with a document and a pie chart, the second image data is blank sheet image data, the third image data is image data of a document over the entire surface of which characters are arranged, the fourth image data is image data of a document on the upper side of which a line of characters are arranged, the fifth image data is blank sheet image data, and the sixth image data is image data of a document on the bottom of which only a character of the count of the page is arranged. The order of the image data is an order of the read (obtained) image data, or an order of the image data preliminary arranged on the print job.

With respect to such as the predetermined count of image data, the blank sheet detecting unit 403 selects one of the image data among the image data in the print job corresponding to the order of the image data, counts the count of a pixel with a black or grey color print density value among the print density values of the pixel constituting this selected image data, and determines whether or not this counted count of the pixel is equal to or less than a predetermined threshold value (such as, several pieces). Thus, the determination by the blank sheet detecting unit 403 whether or not the count of the pixel with the black or grey color print density value is equal to or less than the threshold value among the image data ensures to determine image data including a noise (such as dirt and dust) to be blank sheet image data, for example, even if the image data, which is obtained by reading a blank sheet document, includes this slight noise with black or grey color. Other than the above-described method, the following methods may be employed. For example, performing a predetermined filtering to the image data to delete the noise, then determining whether or not the pixel with the black or grey color print density value exists among the print density value of the pixel of this image data, or determining whether or not all the pixel of this image data is the pixel with the white print density value.

As the result of the determination, assume that the count of the pixel with the black or grey color print density value in the image data exceeds the threshold value (FIG. 5: NO at Step S105). For example, when the blank sheet detecting unit 403 selects the first image data, the blank sheet detecting unit 403 determines that the selected image data is not blank sheet image data (is non-blank sheet image data), and notifies the image processing unit 402 of the determination. With receiving this notification, the image processing unit 402 executes an image formation with the setting condition based on the determined image data (non-blank sheet image data). Then, the image processing unit 402 outputs (discharges) the printed matter printed with this image data to a predetermined sheet discharge tray (such as the sheet discharge tray 122 and the in-barrel tray 124. Here, a description will be given with the sheet discharge tray 122) at a preliminary set sheet discharging speed (FIG. 5: Step S106). This ensures the ordinary image data to be output as s printed matter.

On the other hand, as the result of the determination, assume that the count of the pixel with the black or grey color print density value in the image data is equal to or less than the threshold value (FIG. 5: YES at Step S105). For example, when the blank sheet detecting unit 403 selects the second image data, the blank sheet detecting unit 403 determines that the selected image data is blank sheet image data and notifies a blank sheet processing unit 404 of the determination. With receiving this notification, the blank sheet processing unit 404 detects (detect) the order of the determined blank sheet image data among the image data in the print job (FIG. 5: Step S107). Here, the blank sheet processing unit 404 detects the order of the blank sheet image data as the second.

Next, the blank sheet processing unit 404 outputs a blank sheet corresponding to the blank sheet image data (which is a substantially blank sheet printed matter to which image formation is performed based on the blank sheet image data and printed with the image data, or a printed matter that is output only a sheet as a blank sheet without performing image formation) such that the blank sheet is displaced with respect to a printed matter corresponding to ordinary image data (non-blank sheet image data) by a predetermined amount (FIG. 5: Step S108).

Here, any method may be employed for the blank sheet processing unit 404 to output the blank sheet corresponding to the blank sheet image data with being displaced. For example, the processes can be performed as follows.

Figure 7A:
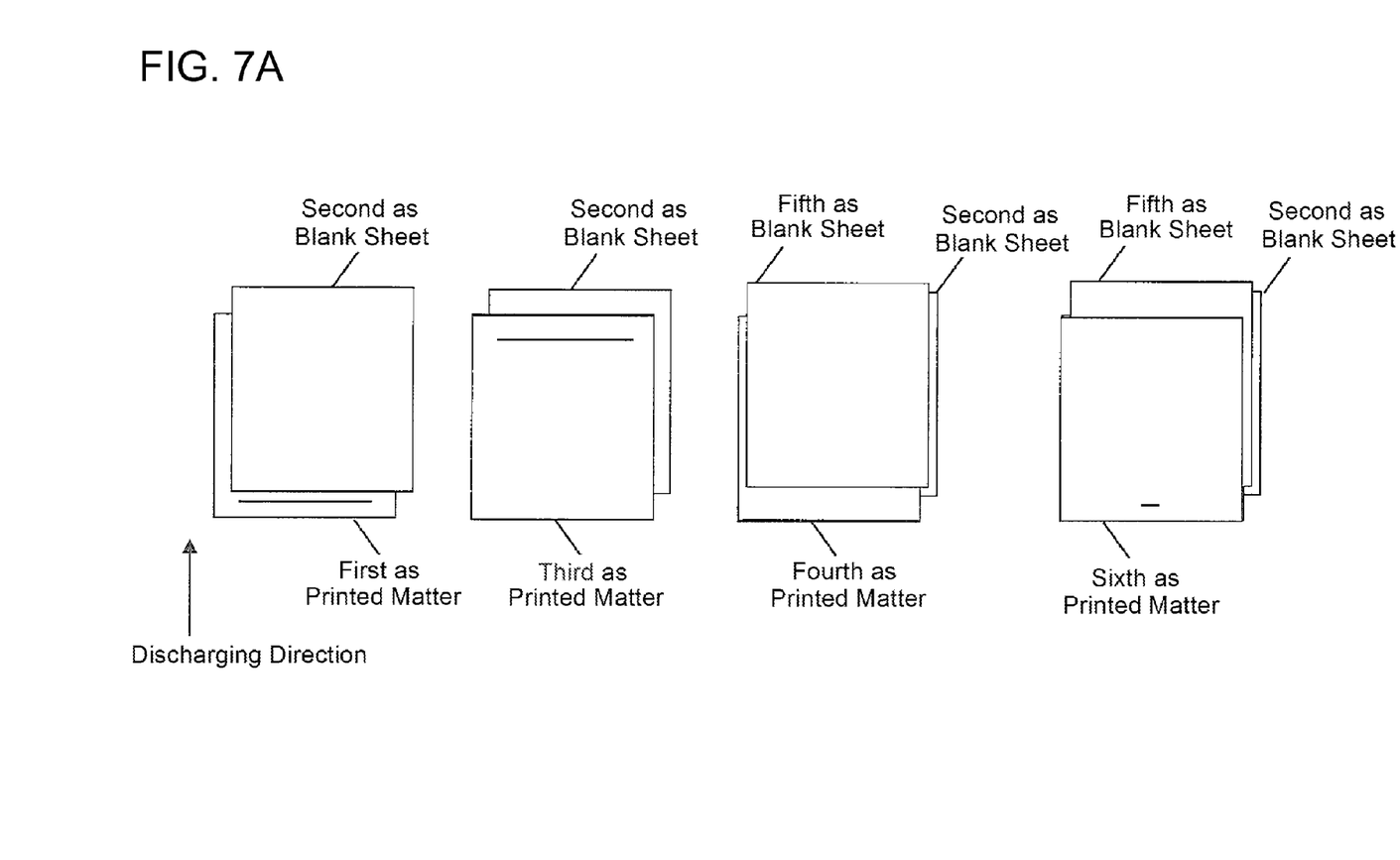
FIG. 7A illustrates a relationship between a blank sheet and a printed matter according to the one embodiment.

That is, when the blank sheet processing unit 404 outputs the blank sheet to the sheet discharge tray 122, the blank sheet processing unit 404 outputs the blank sheet at a higher discharging speed than a discharging speed of the printed matter output by the image processing unit 402, as illustrated in FIG. 7A, this causes the blank sheet (second blank sheet) to be output to be displaced with respect to the printed matter (first printed matter). Accordingly, this ensures to output the printed matter distinguishing from the blank sheet without locating a specific dividing member for distinguishing the blank sheet and the printed matter. If the blank sheet is displaced with such a method, the blank sheet is displaced forward to the printed matter in a discharging direction. When a dividing member is preliminary located in the multi-functional peripheral 100, obviously, the dividing member may be used.

Here, the displaced amount of the blank sheet to the printed matter is adjusted by the discharging speed of the blank sheet. For example, when the blank sheet and the printed matter are placed on the sheet discharge tray 122 with mixed, preferably, the displaced amount is a degree of a displaced amount that the user can easily extract an unintended (unnecessary) blank sheet, and easily align an intentional (necessary) blank sheet with the printed matter. For example, preferably, the displaced amount is within a range of 1 cm to 3 cm.

When the outputting of the printed matter or the blank sheet completes, the blank sheet detecting unit 403 notifies the image processing unit 402 of the completing. This image processing unit 402 determines whether or not the obtaining all the image data in the print job is terminated (FIG. 5: Step S109).

Any method may be employed for the image processing unit 402 to determine whether or not the obtaining all the image data in the print job is terminated. For example, an original document existence detecting sensor, which is preliminary located on the placement table 101*b* of the automatic document feeding unit, may determine whether or not the original document exists on this placement table 101*b*. This ensures to determine whether or not the obtaining all the image data in the print job is terminated.

As the result of the determination, when the obtaining all the image data in the print job is not terminated (FIG. 5: NO at Step S109), the image processing unit 402 returns to Step S104 to read the image data of the remaining original document, and obtains this read image data as the image data for the print job (FIG. 5: Step S104). This ensures the image processing unit 402 to obtain the image data additionally, and ensures the blank sheet detecting unit 403 to determine whether or not the image data in the print job is blank sheet image data by each image data (FIG. 5: Step S105).

Here, in the case of the image data 604 illustrated in FIG. 6B, the blank sheet detecting unit 403 determines the third image data not to be blank sheet image data (which is determined as non-blank sheet image data), and as illustrated in FIG. 7A, the image processing unit 402 outputs the third image data as a printed matter at the ordinary discharging speed. The fourth image data is similarly processed.

On the other hand, in the case of the fifth image data, the blank sheet detecting unit 403 determines the fifth image data to be blank sheet image data, and as illustrated in FIG. 7A, the blank sheet detecting unit 403 outputs a blank sheet of the fifth blank sheet image data displaced a little to the printed matter of the fourth image data. In this case, the blank sheet of the second blank sheet image data and the blank sheet of the fifth blank sheet image data can be seen at a glance to be output displaced to the printed matters.

Then, in the case of the sixth image data, the blank sheet detecting unit 403 determines the sixth image data not to be blank sheet image data (which is determined as non-blank sheet image data), and as illustrated in FIG. 7A, the image processing unit 402 outputs the sixth image data as a printed matter. With this process, the blank sheet detection to all the image data for the print job is executed.

Then, at Step S109, as the result of the determination, if the obtaining all the image data in the print job has been terminated (FIG. 5: YES at Step S109), the image processing unit 402 notifies a blank sheet display unit 405 of the termination. With receiving this notification, the blank sheet display unit 405, at first, determines whether or not blank sheet image data exists among the image data in the print job (FIG. 5: Step S110).

As the result of the determination, if blank sheet image data does not exist among the image data in the print job (FIG. 5: NO at Step S110), in other words, if all the image data in the print job are non-blank sheet image data, and the blank sheet processing unit 404 does not perform the process to the image data at all, the blank sheet display unit 405 notifies the display accepting unit 401 of the result without displaying anything. With receiving this notification, the display accepting unit 401 terminates the print job, and returns to Step S101 to display the operation screen again. In this case, if the blank sheet detecting mode has been set, the display accepting unit 401 terminates the process without displaying such as a blank sheet because no blank sheet image data exists among the image data in the print job.

On the other hand, as the result of the determination, if the blank sheet is detected (FIG. 5: YES at Step S110), the blank sheet display unit 405 displays the blank sheet position (what count of the order the blank sheet positions among the printed matter) in the order of the printed matter (FIG. 5: Step S111).

Any method may be employed for the blank sheet display unit 405 to display the blank sheet position. For example, the processes can be performed as follows.

That is, the blank sheet display unit 405 obtains the blank sheet position detected by the blank sheet processing unit 404 and displays a blank sheet display screen indicating the blank sheet position on the touch panel 201.

Figure 7B:
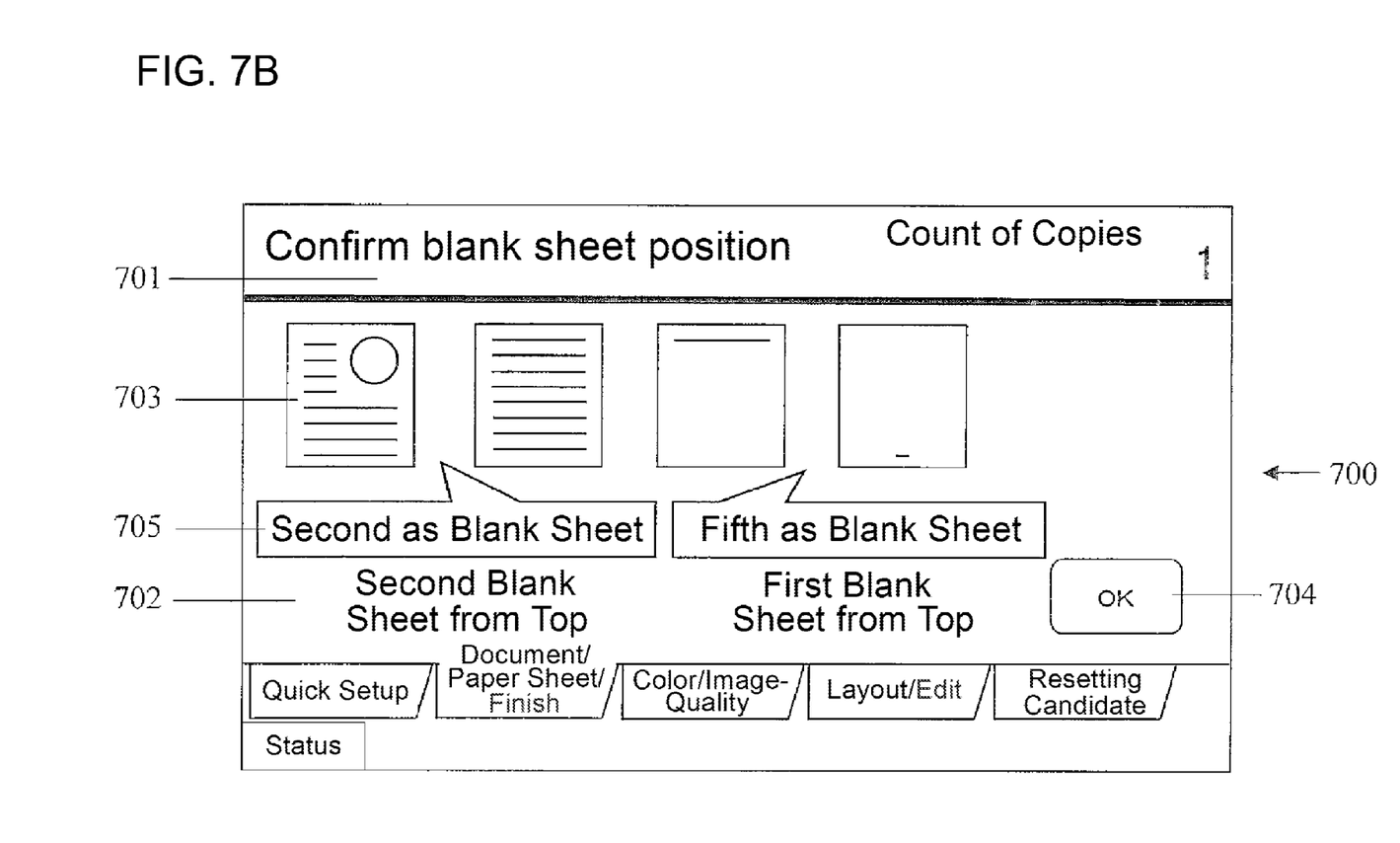
FIG. 7B illustrates an exemplary blank sheet display screen displayed on the touch panel according to the one embodiment.

As illustrated in FIG. 7B, a blank sheet display screen 700 displays a predetermined message "confirm blank sheet position" 701 and a blank sheet position 705, and a preview image 703 of non-blank sheet image data existing before and after this blank sheet, and an OK key 704.

This ensures the user to confirm the existence of blank sheet image data in the print job and the blank sheet position (what count of the order the blank sheet image data positions among the image data) in the order of the image data immediately at a glance of the blank sheet display screen 700. Displaying the preview image 703 ensures the user to confirm the blank sheet whether the user intends or the user does not intend easily with the relation to this preview image 703. Accordingly, in this case, a preview image of the image data determined to be a blank sheet may be displayed together.

Preferably, the blank sheet display unit 405 displays a blank sheet order 702 indicating what count of the order the blank sheet positions in the blank sheet of the printed matter, in addition to the blank sheet position 705 in order to clarify the blank sheet order in the printed matter.

For example, the blank sheet display unit 405 calculates the blank sheet order indicating what count of the order a blank sheet is counting from the blank sheet on the top (being output at last) of the printed matter based on the blank sheet position (the second, the fifth). Specifically, the blank sheet display unit 405 counts the blank sheet of the last order (the fifth) as the first blank sheet from the top (the first), counts the blank sheet at the second from the last (the second) as the second blank sheet from the top. The blank sheet display unit 405 determines the blank sheet order 702 by recounting on an assumption that the last order of the blank sheet order is the first order. This ensures the user to confirm the unintended blank sheet and this blank sheet order 702 (such as the second blank sheet from the top) on the blank sheet display screen 700 illustrated in FIG. 7B to identify the second blank sheet from the top (unintended blank sheet) by counting the order of the displaced blank sheet order in the bundle of the printed matter on the top of which the sixth printed matter is placed (illustrated in FIG. 7A) easily.

The blank sheet order 702 has equivalent meanings to the blank sheet position 705. Then, the blank sheet display unit 405 may display the blank sheet order 702 instead of the blank sheet position 705.

The blank sheet display unit 405 may be configured to display the blank sheet order 702 or the blank sheet position 705 without change by the user choice. The method for the user to choose the blank sheet order 702 or the blank sheet position 705 may be configured such that, for example, when the blank sheet detecting mode key 603 is touched, the display accepting unit 401 displays the blank sheet order 702 and the blank sheet position 705 in a selectable manner to prompt the user to choose.

When the user identifies an unintended blank sheet, the user extracts the blank sheet from the bundle of the printed matter on the sheet discharge tray 122, and returns the blank sheet again to the paper feed cassette 116 (FIG. 5: Step S112). In this case, the user sets this blank sheet in the paper feed cassette 116 with a size corresponding to the blank sheet size. This ensures the user to reuse the blank sheet and reduce the waste of papers.

After the user returns the blank sheet in the paper feed cassette 116, the user aligns the bundle of the printed matter including the intended blank sheet, carries the bundle, and touches the OK key 704 on the blank sheet display screen 700. Then, the blank sheet display unit 405 accepts the touch input of this OK key 704 and notifies the display accepting unit 401 of the selection. After receiving this notification, the display accepting unit 401 terminates the print job and returns to Step S101 to display the operation screen again. Then, all the processes are completed.

As described above, the disclosure includes the blank sheet detecting unit 403 to determine whether the image data in the print job is blank sheet image data or non-blank sheet image by each image data, the blank sheet processing unit 404 to detect the order of the determined blank sheet image data and to output a blank sheet corresponding to this blank sheet image data displaced with respect to a printed matter corresponding to the non-blank sheet image data by a predetermined amount, and the blank sheet display unit 405 to display the blank sheet order among the orders of the printed matter.

This ensures the user to confirm the blank sheet image data to extract the blank sheet from the printed matter when the blank sheet image data exists among the image data in the print job.

In the embodiment of the disclosure, while the blank sheet display unit 405 is configured to display the blank sheet order after all the blank sheet (which is a blank sheet as a printed matter) and the printed matter is output, the blank sheet display unit 405 may be configured to display the blank sheet order before all the blank sheet and the printed matter is output. For example, multi-functional peripheral 100 may be configured as follows. That is, because the blank sheet detecting unit 403 can execute the process of the blank sheet image data such as the existence of the blank sheet image data separately from the output process if the image data in the print job exists, the blank sheet detecting unit 403 performs the process immediately after receiving the image data in the print job, the blank sheet processing unit 404 detects the blank sheet order immediately, and the blank sheet display unit 405 displays the blank sheet order immediately based on the result of the process. In this case, the blank sheet order is displayed during the image processing unit 402 outputs the printed matter or during the blank sheet processing unit 404 outputs the blank sheet.

In the embodiment of the disclosure, while the image processing unit 402 is configured to obtain the image data in the print job by reading the image data in the original document by the user, other configurations may be employed. For example, the image processing unit 402 may have a configuration that the user transmits the image data from a terminal device connected to the multi-functional peripheral 100 communicatively to this multi-functional peripheral 100, and the image processing unit 402 receives the image data to accept this received image data as the image data for the print job. In this case, for example, if the user transmits this print job including the setting of the blank sheet detecting mode in the print job from the terminal device to the multi-functional peripheral 100, the multi-functional peripheral 100 can execute the process of the blank sheet detection as described above.

In the embodiment of the disclosure, while the multi-functional peripheral 100 is configured to include respective units, a configuration that causes a storage medium to store programs to realize these respective units and to provide this storage medium may be employed. This configuration causes the multi-functional peripheral 100 to read the program, and this multi-functional peripheral 100 realizes respective units. In this case, the operations and effects of the disclosure can be achieved by the program itself read from the recording medium. Furthermore, the embodiment of the disclosure can be provided as a method to cause the hard disk to store the step executed by respective units.

As described above, the image forming apparatus and the blank sheet output confirmation method according to the disclosure are effective not only to the multi-functional peripheral but also to the scanner, the copier, the printer, and similar device. The image forming apparatus and the blank sheet output confirmation method according to the disclosure ensures the user to confirm the blank sheet image data to extract the blank sheet from the printed matter easily when the blank sheet image data exists among the image data in the print job.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus for performing image formation based on plural image-data items within a print job to output printed matter, comprising:
   a blank sheet detecting unit that determines whether the each image-data item in the print job is a blank image-data sheet or a nonblank image-data sheet on a per-image-data-item basis;
   a blank sheet processing unit that detects a sequence, in the plural image-data items, of the image data items determined to be blank sheets, and outputs blank sheets corresponding to the blank image-data sheets such that the blank sheets are displaced by a predetermined amount with respect to printed matter corresponding to the nonblank sheet image data; and
   a blank sheet display unit that displays preview images of nonblank image-data sheets present before and after blank image-data sheets in sequence, without displaying preview images of the blank image-data sheets themselves, and displays the sequence of the detected blank image-data sheets among the preview images of the nonblank image-data sheets and meanwhile displays a numerical order for the blank image-data sheets, counted from the position of the last sheet of blank image data that the printed matter comprises.

* * * * *